(12) United States Patent
Rehmann et al.

(10) Patent No.: US 7,729,108 B2
(45) Date of Patent: Jun. 1, 2010

(54) INFORMATION HANDLING SYSTEMS HAVING COATINGS WITH POROUS PARTICLES AND PROCESSES OF FORMING THE SAME

(75) Inventors: Mark L. Rehmann, Georgetown, TX (US); Michael M. Heatly, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 11/954,057

(22) Filed: Dec. 11, 2007

(65) Prior Publication Data
US 2009/0147455 A1    Jun. 11, 2009

(51) Int. Cl.
*H05K 7/20* (2006.01)
(52) U.S. Cl. .................... 361/679.09; 361/679.55; 361/705; 361/708; 361/714; 428/36.5; 428/304.4; 428/336; 428/500; 428/556; 427/105; 427/181; 252/62; 174/137 A; 174/520; 174/546; 29/592.1
(58) Field of Classification Search ............... 361/683, 361/687, 704–712, 731, 816, 818, 831; 174/35 R, 174/35 MS; 312/223.2, 223.3; 165/80.3, 165/104.33, 185; 428/35.7, 36.4, 319.1, 428/292.1, 336, 500, 556, 332, 411.1, 451, 428/457, 209, 304.1, 217, 143, 323, 158, 428/161; 427/496, 508, 409, 410
See application file for complete search history.

(56) References Cited

U.S. PATENT DOCUMENTS

| 5,124,364 | A | * | 6/1992 | Wolff et al. ................... 521/55 |
| 5,401,348 | A | * | 3/1995 | Oguchi et al. ............... 156/247 |
| 5,510,395 | A | * | 4/1996 | Tomioka et al. ............. 521/184 |
| 5,898,567 | A | * | 4/1999 | Satake ................... 361/679.09 |

(Continued)

FOREIGN PATENT DOCUMENTS

JP      02000148306  A  *  5/2000

(Continued)

OTHER PUBLICATIONS

Industrial Nanotech Inc.; "Nansulate-GP-Translucent"; Material Safety Data Sheet; Oct. 11, 2006; 3 pages.

(Continued)

*Primary Examiner*—Michael V Datskovskiy
(74) *Attorney, Agent, or Firm*—Larson Newman & Abel, LLP

(57) ABSTRACT

Particles having a relatively high porosity can be used in an information handling system or other information handling system. In one aspect, a portable information handling system can include an electrical circuit that can generate thermal energy during normal operation of the electrical circuit. The portable information handling system can also include a housing that includes a first material and particles having a porosity of at least 80%. In another aspect, an information handling system can include a housing that includes a material and a coating, wherein the coating includes a polymeric material and particles having a porosity of at least 80%. In another aspect, a process of forming an information handling system can include coating a surface of a housing, wherein the coating includes particles having a porosity of at least 80%, and placing an electrical circuit within the housing after coating the surface.

9 Claims, 4 Drawing Sheets

U.S. PATENT DOCUMENTS

| | | | | |
|---|---|---|---|---|
| 5,948,314 | A * | 9/1999 | Geiss et al. | 252/62 |
| 6,073,684 | A * | 6/2000 | Fiechter et al. | 165/104.33 |
| 6,253,838 | B1 * | 7/2001 | Fiechter et al. | 165/104.33 |
| 6,262,886 | B1 * | 7/2001 | DiFonzo et al. | 361/679.34 |
| 6,304,459 | B1 * | 10/2001 | Toyosato et al. | 361/679.03 |
| 6,317,321 | B1 * | 11/2001 | Fitch et al. | 361/700 |
| 6,355,332 | B1 * | 3/2002 | Kobayashi | 428/143 |
| 6,358,595 | B1 * | 3/2002 | Kobayashi | 428/143 |
| 6,413,623 | B2 * | 7/2002 | Lewis et al. | 428/304.4 |
| 6,414,844 | B1 * | 7/2002 | Shimada et al. | 361/679.54 |
| 6,428,886 | B1 * | 8/2002 | Lewis et al. | 428/332 |
| 6,621,702 | B2 * | 9/2003 | Elias et al. | 361/700 |
| 6,672,902 | B2 * | 1/2004 | Skinner et al. | 439/607 |
| 6,696,106 | B1 * | 2/2004 | Schultz et al. | 427/496 |
| 6,746,638 | B1 * | 6/2004 | Zadesky et al. | 264/135 |
| 6,791,029 | B2 * | 9/2004 | Mori et al. | 174/520 |
| 6,819,559 | B1 * | 11/2004 | Seeger et al. | 361/679.46 |
| 6,859,364 | B2 * | 2/2005 | Yuasa et al. | 361/679.54 |
| 6,980,418 | B1 * | 12/2005 | Seeger et al. | 361/679.54 |
| 7,022,377 | B2 * | 4/2006 | Kanada et al. | 427/243 |
| 7,118,801 | B2 * | 10/2006 | Ristic-Lehmann et al. | 428/292.1 |
| 7,144,522 | B2 | 12/2006 | Burchill, Jr. et al. | |
| 7,228,894 | B2 * | 6/2007 | Moore et al. | 165/185 |
| 7,238,311 | B2 * | 7/2007 | Ristic-Lehmann et al. | 264/120 |
| 7,311,966 | B2 * | 12/2007 | Yao et al. | 428/319.1 |
| 7,342,793 | B2 * | 3/2008 | Ristic-Lehmann et al. | 361/708 |
| 7,349,215 | B2 * | 3/2008 | Ristic-Lehmann et al. | 361/708 |
| 7,455,886 | B2 * | 11/2008 | Rao et al. | 427/385.5 |
| 7,470,725 | B2 * | 12/2008 | Schwertfeger et al. | 516/100 |
| 2002/0166682 | A1 * | 11/2002 | Watchko et al. | 174/35 R |
| 2005/0028999 | A1 * | 2/2005 | Leu et al. | 174/35 MS |
| 2005/0281994 | A1 * | 12/2005 | Tani et al. | 428/209 |
| 2006/0145302 | A1 * | 7/2006 | Kim et al. | 257/629 |
| 2006/0261304 | A1 * | 11/2006 | Muthukumaran et al. | 252/62 |
| 2007/0102098 | A1 * | 5/2007 | Wang | 156/154 |
| 2007/0243349 | A1 * | 10/2007 | Chang | 428/35.7 |
| 2008/0038544 | A1 * | 2/2008 | Kitaike et al. | 428/336 |
| 2008/0166511 | A1 * | 7/2008 | Honma et al. | 428/36.4 |
| 2008/0241490 | A1 * | 10/2008 | Newman et al. | 428/206 |
| 2008/0242783 | A1 * | 10/2008 | Ganesan et al. | 524/413 |

FOREIGN PATENT DOCUMENTS

| | | | |
|---|---|---|---|
| JP | 02007250725 A | * | 9/2007 |
| WO | WO 2007/101799 A2 | * | 9/2007 |

OTHER PUBLICATIONS

Industrial Nanotech Inc.;"Nansulate-Home Protect White Interior"; Material Safety Data Sheet; February 7, 2008; 3 pages.

"Overview of Materials for Polytetrafluoroethylene (PTFE), Glass Filled, Molded"; www.matweb.com; Jun. 19, 2009; 3 pages.

"Overview of Materials for Polytetrafluoroethylene (PTFE), Molded"; www.matweb.com; Jun. 19, 2009; 3 pages.

"Overview of Materials for Styrene/Methyl Mathacrylate Copolymer (SMMA)(Acrylic)"; www.matweb.com; Jun. 19, 2009; 1 page.

Nano Pioneers; INI Distributor Weekly Update; Sep. 16, 2005; 1 page.

* cited by examiner

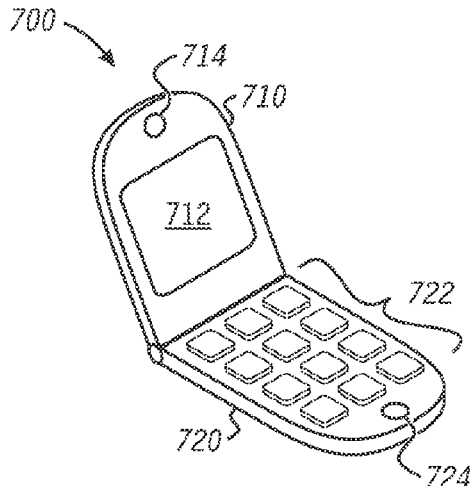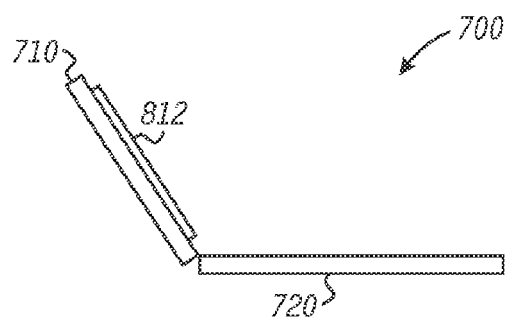
*FIG. 7*  *FIG. 8*
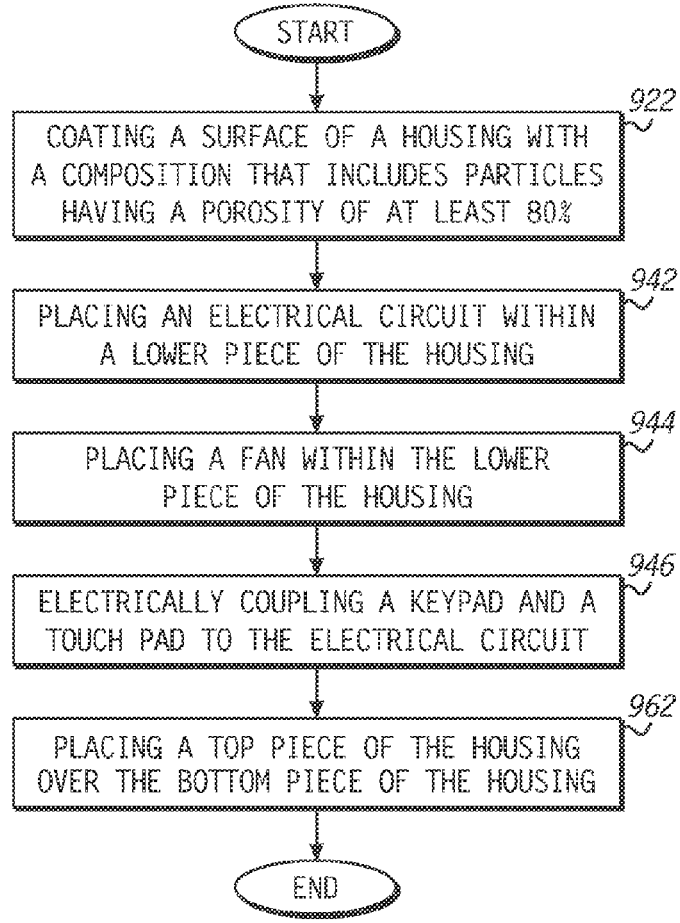
*FIG. 9*

INFORMATION HANDLING SYSTEMS HAVING COATINGS WITH POROUS PARTICLES AND PROCESSES OF FORMING THE SAME

FIELD OF THE DISCLOSURE

This disclosure relates generally to information handling systems, and more particularly to information handling systems having coatings with porous particles and processes of forming the same.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

FIGS. 7 and 8 include perspective and side views of a cellular phone with a coating over a display of the cellular phone.

FIG. 9 includes a flow diagram illustration an embodiment in which a housing is coated with a material having a relatively lower heat conduction rate as compared to the material over which the coating is applied.

The use of the same reference symbols in different figures indicates similar or identical items.

DETAILED DESCRIPTION

Figure 1:
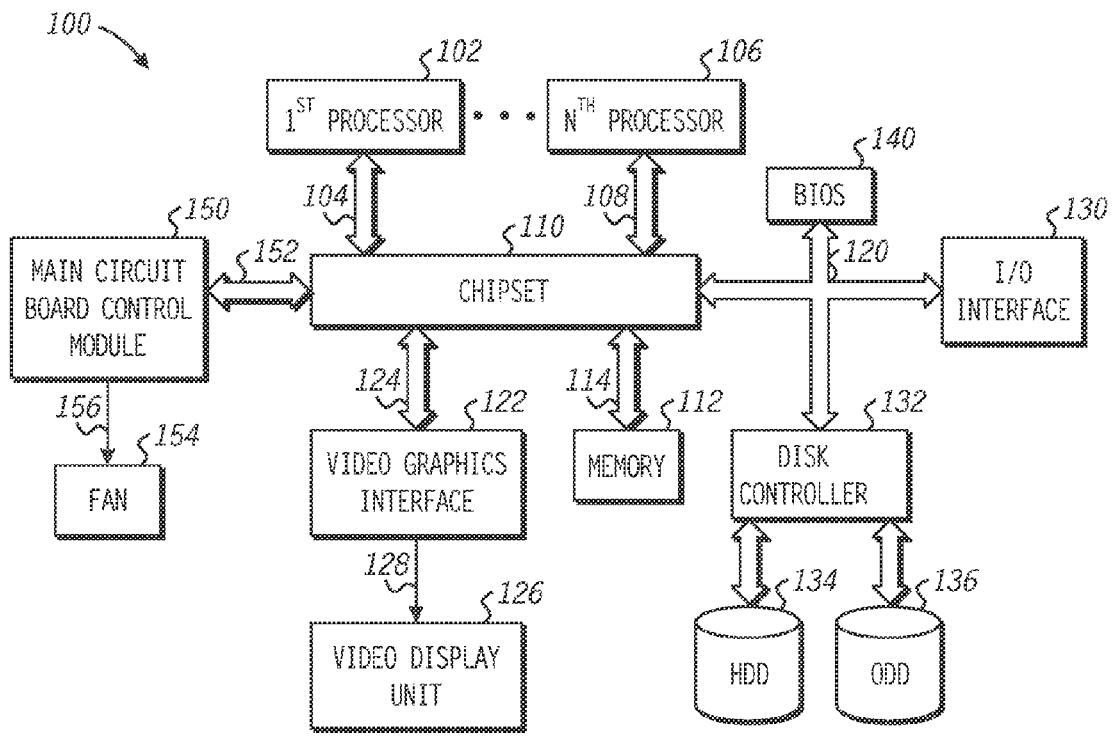
FIG. 1 includes a functional block diagram of an information handling system including a basic input/output system and a main circuit board control module.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a personal digital assistant (PDA), a cellular phone, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

According to an aspect, a portable information handling system can include an electrical circuit that can generate thermal energy during normal operation of the electrical circuit. The portable information handling system can also include a housing designed to contact a human during normal operation of the portable information handling system, wherein the housing includes a first material and particles having a porosity of at least 80%.

According to another aspect, an information handling system can include a baseboard including a microprocessor. The information handling system can also include a housing including a piece. The piece can be designed such that it can be placed on a part of an operator during normal use of the information handling system, and include a material and a coating that lies between the material and the baseboard. The coating can include a first polymeric material and first particles having a porosity of at least 80%.

According to a further aspect, a process of forming an information handling system can include coating a surface of a housing, wherein the coating includes particles having a porosity of at least 80%. The process can also include placing an electrical circuit within the housing after coating the surface, wherein the electrical circuit that can generate thermal energy during normal operation of the electrical circuit.

An information handling system and process of forming it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a functional block diagram of an exemplary embodiment of an information handling system, generally designated at 100. In one form, the information handling system 100 can be a computer system such as a server. Alternatively, the information handling system 100 can include a desktop computer, a laptop computer, another similar computer, a rack of computers (e.g., networked servers), or any combination thereof. Other implementations can be used. After reading this specification, skilled artisans will appreciate that the information handling system can be configured to their particular needs or desires.

As illustrated in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a third host bus 114. In a particular embodiment, the host buses 104, 108, and 114 can be individual buses or part of the same bus. The chipset 110 can also provide bus control and can handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

In the description below, a physical description of hardware, firmware, or software embodiments is described with respect to FIGS. 1 to 4. Much of the physical description will include couplings, connections, and some functionality description. A method description is described with respect to FIGS. 5 and 6, with references to the components of described in FIGS. 1 to 4.

The information handling system 100 can also include a video graphics interface 122 that can be coupled to the chipset 110 using fourth host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O bus 120 and the I/O interface 130 can include industry standard buses or proprietary buses and respective interfaces or controllers. The I/O bus 120 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O host bus 120 including other industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 coupled to the fourth bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include basic input/output system (BIOS) module 140 that can be coupled to the I/O bus 120. The BIOS module 140 is operable to detect and identify components within the information handling system 100 and to provide the appropriate drivers for those components. The BIOS module 140 can be in the form of hardware, software, firmware, or any combination thereof. The BIOS module 160 may be a standalone integrated circuit or chip set or can be shared within other functions within an integrated circuit or chip set. Other functions and operations of modules within the BIOS module 160 are described with respect to FIG. 3.

The information handling system 100 can further include main circuit board control module 150 that can be coupled to the chipset 110 via a system communication bus 152, such as a control bus. The main circuit board control module 150 may reside on a main circuit board, such as a baseboard, a motherboard, or the like. Although not illustrated, other components, such as the processors (1st processor 102 through the $n^{th}$ processor 106), the video display unit 126, the video graphic interface 122, the memory 112, and the disk controller 132 can be coupled to the main circuit board control module 150. Commands, communications, or other signals may be sent to or received from the main circuit board control module 150 by any one or combination of components previously described. The main circuit board control module 150 of an integrated circuit or a chip set within the information handling system 100. The main circuit board control module 150 can also be coupled to a fan 154 via a fan interface 156. In one embodiment, the fan 154 is a single fan, and in another embodiment is a set of fans. The system bus 152 and fan interface 156 can be an I²C bus, a System Manager (SM) bus, another suitable communication medium, or any combination thereof.

Figure 2:
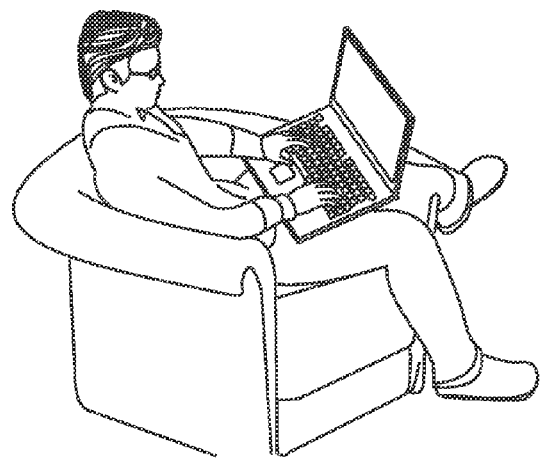
FIG. 2 includes an illustration of a person with a laptop computer on the person's lap while using the laptop computer.
Figure 3:
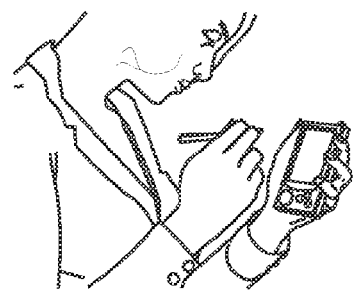
FIG. 3 includes an illustration of a person with a personal digital assistant in the person's palm while using the personal digital assistant.
Figure 4:
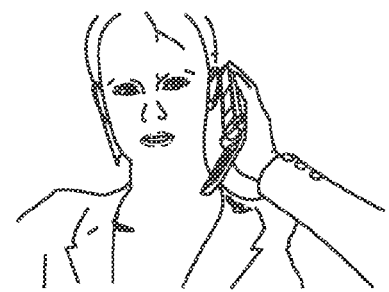
FIG. 4 includes an illustration of a person with a cellular phone near the person's ear while using the cellular phone.

An information handling system, such as the information handling system 100, can be in many different forms with different uses, some of which are described with respect to FIGS. 2 to 4. The information handling system can include a portable information handling system. As used herein, a portable information handling system includes an information handling system that is readily transported by a user when the device is use or not in use. Generally, a portable information handling system has at least one dimension that does not exceed nine cm. For example the thickness of a laptop computer, a PDA, or a cellular phone, may be less then nine cm, and in another embodiment may be less than five cm. Also, in one embodiment, the mass of the portable information handling system may be no greater than 5 kg, and in another embodiment may be less than 3 kg. In other embodiment, the dimensions and mass may be greater or less than those described above.

FIG. 2 includes an illustration of a user that has a laptop computer on the user's lap. While the laptop computer is operating, a significant amount of heat may be generated as thermal energy by electrical circuits within the laptop computer. This heat may be transmitted through the housing to the lap of the user. Heat may also be transferred through the housing to areas where the user's wrists rest while using the laptop computer (e.g., while using a keypad or a touch pad). FIG. 3 includes an illustration of a PDA. The PDA may be held in the palm of a user while the PDA is in operation. Heat from electrical circuits within the PDA may be transmitted through the housing to the user's palm. FIG. 4 includes an illustration of a user using a cellular phone. While the cellular phone is in use, it may be placed near the user's ear. The user's ear or other adjacent regions of the user's head may become hot after using the cellular phone for 10 minutes or longer.

In each of the applications as illustrated in the FIGS. 2 to 4, the parts of the user's body is in contact with a portable information handling system or other information handling system, such as the laptop computer, the PDA, the cellular phone, or the like, such parts of the user may become uncomfortable due to the amount of heat that is radiated or reflected. To reduce the amount of heat experienced by the user, particles having a relatively high degree of porosity may be used in conjunction with a housing of an information handling system, such as a portable information handling system. The particles may be part of a coating that can be applied to one or more surfaces of a housing or different pieces of a housing. Alternatively, the particles may be embedded within a material used for the housing. The selection, whether to use a coating with particles or a material with embedded particles, may depend on a particular application or to meet the needs or desires of the designer of the information handling system.

Figure 5:
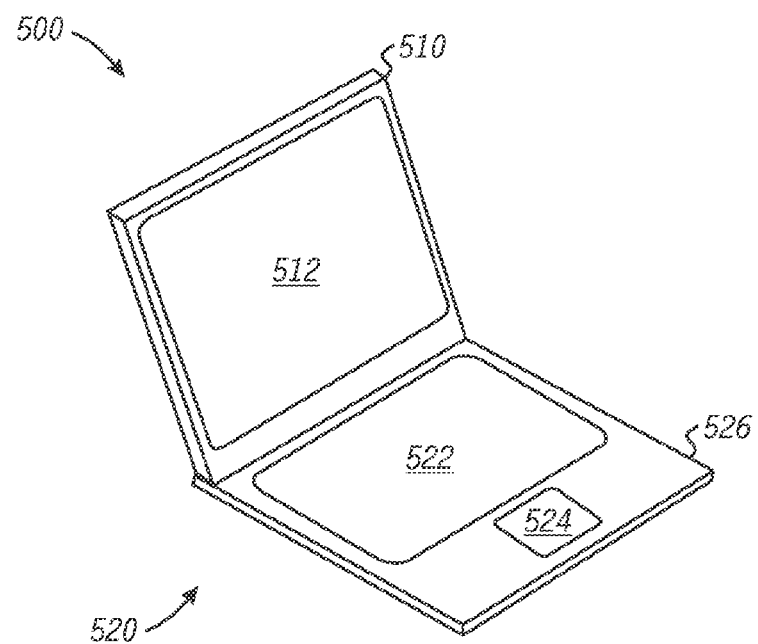
FIG. 5 includes an illustration of a perspective view of a laptop computer.

In one particular embodiment, an information handling system, such as a laptop computer 500 in FIG. 5, may take advantage of these particles to reduce the thermal conduction rate through the housing. The laptop computer 500 can include a display unit 510 that includes a display 512. The laptop computer 500 can also include a base unit 520. The base unit can include a housing 526 that includes openings for a keypad 522 and a touchpad 524. As used herein, the term keypad also includes a keyboard. When the user is using the laptop computer 500, the lap of the user may be in contact with a bottom side of the base unit 520, and the wrists of the user may contact the housing 526 adjacent to the touchpad 524. Thus, in order to reduce user discomfort from extended in use of the laptop computer 500, particles may be embedded within a material for the housing 526 or the housing 526 may include a coating that includes particles that cover a material. When a coating is used, the coating can be applied to an inner surface of the housing 526, an outer surface of the housing 526, or both the inner and outer surfaces of the housing 526.

Figure 6:
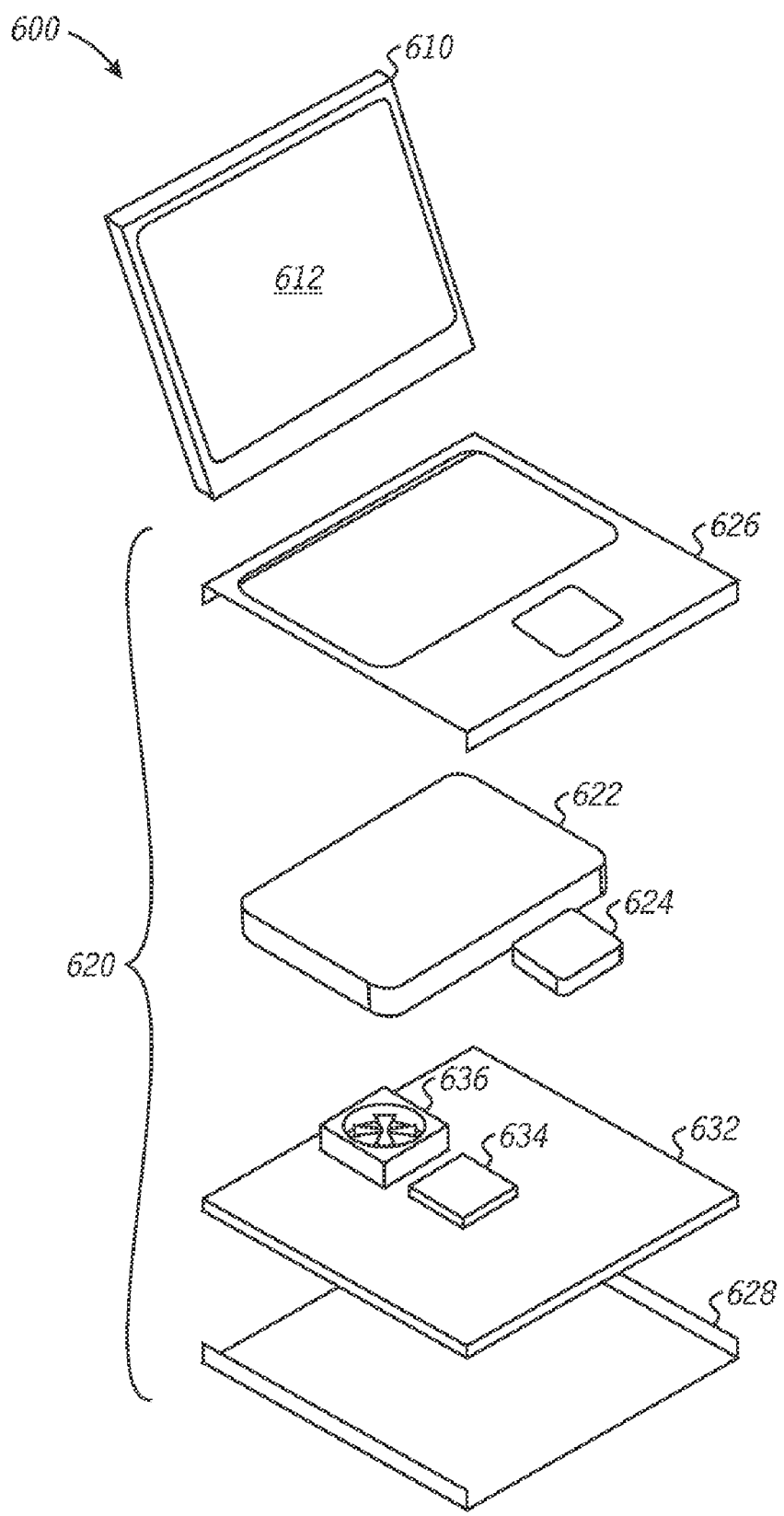
FIG. 6 includes an illustration of a perspective view of the laptop computer in FIG. 5 after separating different parts of the laptop computer.

FIG. 6 includes a laptop computer 600, that can be the same or different from the laptop computer 500 in FIG. 5. The laptop computer 600 can include a display unit 610 that has a display 612 within the display unit 610. The laptop computer 600 can also include a base unit 620. In FIG. 6, the base unit 620 is partially separated to illustrate positional relationships between different components of the base unit 620. The base unit 620 can include a housing top piece 626 and a housing bottom piece 628. The base unit 620 also can include a baseboard 632 and a microprocessor 634 coupled to the baseboard 632. In one particular embodiment, the baseboard 632 can be a motherboard for the laptop computer 600. Another printed wiring board may be included within the housing but is not illustrated in FIG. 6. The printed wiring board can include a video card, a network interface card, an audio processor, a wireless transceiver, interface ports, another suitable electronic component, or any combination thereof. The base unit 620 can also include a fan 636. The fan 636 can be used to affect gas flow within the housing. More specifically, the fan 636 can affect air flow adjacent to the microprocessor 634, another thermal energy generating component, a thermally sensitive component, or any combination thereof. The base unit 620 can also include a keypad 622 and a touchpad 624 that are electrically coupled to the baseboard 632. Such coupling may be direct or through separate input/output components (not illustrated) which in turn are coupled to the baseboard 632. Portions of the keypad 622 and touchpad 624 can be accessed through openings with in the housing top piece 626.

The housing top piece 626, the housing bottom piece 628, or both may include particles within a material or may have a separate coating on an inner surface and outer surface, or both an inner surface and outer surface of the material. In one particular embodiment, the housing top piece 626 and the housing bottom piece 628 can be a plastic or a metal-containing material, such as aluminum, stainless steel, or the like. While the metal-containing material may have advantages with respect to durability, the metal-containing material can transmit a significant amount of heat. Therefore, a coating can be applied to one or more surfaces of the housing pieces 626 and 628. More details regarding the process for applying the coating are described with respect to FIG. 9.

FIGS. 7 and 8 include a perspective view and a side view, respectively, of a cellular phone 700. The cellular phone 700 can include a display unit 710 and a base unit 720. The display unit 710 can include a display 712 and a speaker 714. The base unit 720 can include a keypad 722 and a microphone 724. In order to reduce the thermal transmission or reflection of heat to user, a coating 812 can be applied to a surface that covers the display 712. The coating 812 can reduce the amount of heat near the user's ear when the user's ear is close to the speaker 714 during use. In one particular embodiment, the display 712 may be covered by a polycarbonate, glass, or other protective sheet, which is at least partly covered by the coating 812 that has particles with a relatively high porosity. The coating 812 can be formed using process flow similar to that as described with respect to FIG. 9.

FIG. 9 includes a process flow diagram for forming a portable information handling system. A coating can be applied to one or more services of a housing. The process includes coating a surface of a housing with a composition that includes particles having a porosity of at least 80% and a particle size in the range from 5 to 900 microns. The particles can include aerogel particles, xerogel particles, or any combination thereof. The particles can include silicon, carbon, or any combination thereof. In one particular embodiment, particles of amorphous silica aerogels or xerogels, or particles of carbon aerogels or xerogels may be used. The aerogel or xerogel from which the highly porous particles are made may be hydrophobic or hydrophilic. In one embodiment, the aerogel or xerogel is a nonmetal oxide aerogel or xerogel in which the hydrogen atom in terminal hydroxy groups is substituted by a non-polar group. The non-polar group can impart hydrophibicity to the aerogel or xerogel. In a particular embodiment, the non-polar group can include a methyl, ethyl, or propyl group. Other non-polar organic groups can also be used. The coating can include approximately 1 to 10 wt % particles.

The coating can be soluble in water or an organic solvent. The coating includes a compound that can form a polymer. The polymer can be a homopolymer or a copolymer. An example of a suitable polymer can include an acrylic polymer, an acrylic-containing copolymer, a styrene butadiene copolymer, an acetates polymer, a polyester polymer, or any combination thereof. In a particular embodiment, the compound can form an acrylic styrene copolymer is used. The coating can include approximately 11 to 40 wt % of the polymer-forming compound.

The coating can also include a solvent, such as an aliphatic hydrocarbon, an aromatic hydrocarbon, an alcohol, an acetate, a glycol ether, a glycol ether ester or any combination thereof. In a particular embodiment, the solvent can include hexane, toluene, xylene, isopropanol, ethyl acetate, diethylene glycol monoethyl ether, or any combination thereof. The coating can include approximately 5 to 9 wt % of the solvent.

Other additives, such as a stabilizer, a dispersing agent, a surfactant, a leveling agent, a rheology modifier (e.g., a thickening agent), an anti-foaming agent, or a defoaming agent, a coalescing agent, a curing agent, an extender, a whitening agent, a flame retardant, a fungicide, mildewcide or biocide, an anti-corrosion agent, or any combination thereof, may also be used. After reading this specification, skilled artisans will be able to determine which if any additives are needed or desired in the coating for their particular application.

The coating may be applied to any surface or a plurality of surfaces of the housing. In a particular embodiment, Nansulate™-brand coating, available from Industrial Nanotech, Inc. of Naples, Fla., U.S.A., can be used for the coating. The application can include applying the coating onto the housing with an applicator, such as a brush or a roller, spraying the coating onto the housing, dipping the housing into the coating, or by another suitable process. The coating can then be allowed to dry. In one particular embodiment the coating has a thickness no greater than 900 microns (approximately 40 mils) and in another embodiment has a thickness no greater than approximately 90 microns (approximately 4 mils). Drying may be performed at a temperature in a range of approximately 5° C. to approximately 52° C. for a time period of approximately 45 to 90 minutes, depending on the humidity. In one embodiment, the drying can be performed using room air, or may be performed using a substantially moisture-free ambient, such has clean dry air, nitrogen, argon, or another suitable gas, or any combination thereof.

The coating can be cured during drying or may be cured separately from drying. Curing can be performed at room temperature over an extended period, or it can be performed at a higher temperature or for a shorter time period. In addition, the curing may be accelerated using ultraviolet or other suitable radiation. In one embodiment, an activator can be used in conjunction with the ultraviolet or other light to accelerate the curing process.

After the coating is dry, various components may the placed within a portion of the housing. Curing of the coating may or may not have been completed before the components are placed within the housing. In one particular embodiment, the process can include placing an electrical circuit within a lower piece of the housing, and placing a fan within the lower piece of the housing, at blocks 942 and 944 in FIG. 9. The method can also include electrically coupling a keypad and a touchpad to the electrical circuit, at block 946. Referring briefly to FIG. 6, the baseboard 632, including the microprocessor 634, and the fan 636 can be placed within the housing bottom piece 628. The keyboard 622 and a touchpad 624 can be electrically coupled to the baseboard 632.

The method can still further include placing the top piece of the housing over the bottom piece of the housing, at block 962 in FIG. 9. Briefly referring to FIG. 6, the housing top piece 626 can be placed such that the openings within the housing top piece 626 are aligned such that the keypad 622 and a touchpad 624 are accessible through the openings within the housing top piece 626. The housing top piece 626 and the housing bottom piece 628 can be attached or otherwise secured to one another. The display unit 610 can then be attached to the base unit 620. The attachment can include the electrical coupling all of the display 612 to the baseboard 632 and also the physical attachment of the display unit to the bottom portion 620.

While the process in FIG. 9 is relatively specific, skilled artisans will appreciate that many other process flows can be used. For example, the cellular phone in FIGS. 7 and 8 may have the coating applied to a protective sheet, such as a polycarbonate film, before the protective sheet is attached to the display unit 710, after the protective sheet is attached to the display unit 710, or after the display unit 710 and is attached to the base unit 720. Thus, after reading the specification skilled artisans will appreciate that the process all of applying a coating to a material of a housing can be performed and many different times, can include nearly any number of services, and can be performed without significant problems.

Embodiments as described herein can help to reduce the thermal conduction rate through a portion of an information handling system. A user can be in contact with a portable information handling system (a laptop computer, a cellular phone, a PDA, or the like) for an extended time with less discomfort. Even a reduction of the skin temperature of a housing by a few degrees can significantly reduce using discomfort. Many different types of information handling systems can be used with the highly porous particles. Of those different types of information handling systems, the highly porous particles may be more beneficial to those systems with metal housings.

Implementation of using the highly porous particles is flexible and can be tailored to a particular application or concern. The particles can be embedded or part of a coating. What a coating is used, it can be applied on an inner surface or an outer surface. All of part of the surface can be covered. The coating can be applied using a brushing, spraying or dipping technique. The materials used to form the polymer and the solvent can also be varied. In one embodiment, water soluble materials may be used to reduce handling and environmental concerns. The coating can be cured over an extended period of time. For example, after the coating is dried onto a surface of a housing, circuit board and other electronic components can be installed. The coating may not be cured until the information handling system is being shipped. After reading this specification, skilled artisans will appreciate the wide latitude in location of the particles and the manufacturing flexibility.

After reading this specification, skilled artisans will appreciate that thermal dissipation of the information handling system could be affected by using the highly porous particles. For example, thermal energy being transmitted though the housing (when embedded particles are used) or the combination of housing and coating may be less. Therefore, an adjustment to the thermal design or cooling system may be used. For example, the fan speed of the fan may be increased so that more air flows through the information handling system. The coatings can be relatively thin, and therefore, not significantly affect the air flow within the information handling system. Thus, the adjustments are not expected to be insurmountable.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a portable information handling system can include an electrical circuit that can generate thermal energy during normal operation of the electrical circuit. The information handling system can also include a housing designed to contact a human during normal operation of the portable information handling system, wherein the housing includes a first material and particles having a porosity of at least 80%.

In one embodiment of the first aspect, the particles are embedded within the first material. In another embodiment, the particles are embedded within a coating that lies along a surface of the housing. In a particular embodiment, the first material includes an electrically conductive metallic material. In a more particular embodiment the coating includes a styrene-acrylic copolymer, and the particles do not include a significant amount of a metallic element. In another particular embodiment, wherein the coating has a thickness no greater than 900 microns.

In a further embodiment of the first aspect, the portable information handling system has a dimension no greater than 9 cm and a mass no greater than 5 Kg. In a particular embodiment, the portable information handling system includes a laptop computer, a personal digital assistant, a multimedia player, or a cellular phone.

In a second aspect, an information handling system can include a baseboard including a microprocessor. The information handling system can also include a housing including a first piece. The first piece can be designed such that it can be placed on a part of an operator during normal use of the information handling system. The first piece can include a first material and a first coating that lies between the first material and the baseboard. The first coating can include a first polymeric material and first particles having a porosity of at least 80%.

In one embodiment of the second aspect, the information handling system further includes a keypad and a fan that can affect gas flow adjacent to the baseboard. The housing can further include a second piece, wherein the second piece includes an opening, wherein the keypad lies within the opening, and the second piece includes a first surface and a second surface opposite the first surface. The first surface can have an area sufficient for the operator to rest an operator's wrist when the operator would use the keypad. The second piece can include a second material and a second coating that lies along the second surface of the second piece, and the second coating can include a second polymeric material and second particles having a porosity of at least 80%. In a particular embodiment, the first material and the second material are substantially a same material, and the first coating and the second coating have substantially a same composition. In another embodiment of the second aspect, the first material includes an electrically conductive metallic material, the first coating includes a styrene-acrylic copolymer, the particles do not include a significant amount of a metallic element, and the first coating has a thickness no greater than 300 microns.

In a third aspect, a process of forming an information handling system can include coating a surface of a housing, wherein the coating includes particles having a porosity of at least 80%. The process can also include placing an electrical circuit within the housing after coating the surface, wherein the electrical circuit that can generate thermal energy during normal operation of the electrical circuit.

In one embodiment of the third aspect, the coating includes precursors for a styrene-acrylic copolymer. In a particular embodiment, the coating includes dipropylene glycol monobutyl ether. In still another embodiment, the particles do not include a metallic element. In a particular embodiment, the housing includes a metallic surface. In a further embodiment, coating the surface includes coating an inner surface of the housing. In still a further embodiment, coating the surface includes coating an outer surface of the housing. In a particular embodiment, the electrical circuit includes a display of a cellular phone, and coating the outer surface of the housing includes coating a screen of the display.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A process of forming an information handling system comprising:

coating a surface of a housing, wherein the coating includes particles having a porosity of at least 80%; and placing an electrical circuit within the housing after coating the surface and before the coating on the surface of the housing is completely cured, wherein the electrical circuit can generate thermal energy during normal operation of the electrical circuit.

2. The process of claim 1, wherein the coating includes precursors for a styrene-acrylic copolymer.

3. The process of claim 1, wherein the coating includes dipropylene glycol monobutyl ether.

4. The process of claim 1, wherein the particles do not include a metallic element.

5. The process of claim 4, wherein the housing includes a metallic surface.

6. The process of claim 1, wherein:
the electrical circuit comprises a display of a cellular phone; and
coating the outer surface of the housing comprises coating a screen of the display.

7. The process of claim 1, wherein the coating has a thickness no greater than approximately 300 microns.

8. The process of claim 1, wherein curing comprises exposing the coating to ultraviolet radiation.

9. The process of claim 1, further comprising drying the coating on the surface of the housing.

* * * * *